US006847830B1

(12) United States Patent
Vanderhelm et al.

(10) Patent No.: US 6,847,830 B1
(45) Date of Patent: Jan. 25, 2005

(54) RETRACTABLE ANTENNA FOR PERSONAL COMPUTER CARD

(75) Inventors: Ron Vanderhelm, Surrey (CA); Wei Mou, Port Coquitlam (CA); Andrey Gleener, Burnaby (CA)

(73) Assignee: Sierra Wireless, INC, Richmond (CA)

( * ) Notice: Subject to any disclaimer, the term of this patent is extended or adjusted under 35 U.S.C. 154(b) by 0 days.

(21) Appl. No.: 09/534,016

(22) Filed: Mar. 24, 2000

(51) Int. Cl.[7] .................................................. H04B 1/38

(52) U.S. Cl. ..................... 455/558; 455/575.7; 455/903

(58) Field of Search ................................ 455/556–558, 455/550.1, 575.1, 90.3, 556.1, 575.7; 343/702, 872, 882–883, 889, 901; 361/737

(56) References Cited

U.S. PATENT DOCUMENTS

| | | | | | |
|---|---|---|---|---|---|
| 4,860,024 | A | * | 8/1989 | Egashira | 343/702 |
| 5,136,302 | A | | 8/1992 | Chin et al. | 343/702 |
| 5,343,213 | A | * | 8/1994 | Kottke et al. | 343/702 |
| 5,557,288 | A | * | 9/1996 | Kato et al. | 343/702 |
| 5,617,106 | A | | 4/1997 | Tahmassebpur | |
| 5,628,055 | A | | 5/1997 | Stein | |
| 5,644,320 | A | * | 7/1997 | Rossi | 343/702 |
| 5,913,174 | A | | 6/1999 | Casarez et al. | |
| 5,929,815 | A | * | 7/1999 | Elderfield | 343/702 |
| 5,949,379 | A | | 9/1999 | Yang | |
| 6,034,639 | A | * | 3/2000 | Rawlins et al. | 343/702 |
| 6,052,089 | A | * | 4/2000 | Eggleston | 343/702 |
| 6,064,342 | A | * | 5/2000 | Sandhu et al. | 343/702 |
| 6,091,971 | A | * | 7/2000 | Jocher | 455/575.5 |
| 6,133,884 | A | * | 10/2000 | Talvitie et al. | 343/702 |
| 6,266,017 | B1 | * | 7/2001 | Aldous | 343/702 |
| 6,307,513 | B1 | * | 10/2001 | Gaucher et al. | 343/702 |
| 6,400,931 | B1 | * | 6/2002 | Inkinen et al. | 455/90 |
| 2002/0013094 | A1 | * | 1/2002 | Jones et al. | 439/625 |

FOREIGN PATENT DOCUMENTS

| | | | |
|---|---|---|---|
| EP | 0 773 633 | A2 | 5/1997 |
| GB | 2 327 153 | A | 1/1999 |

OTHER PUBLICATIONS http://www.breezecom.com/Products/SAPXDS.htm.

* cited by examiner

*Primary Examiner*—Erika Gary
(74) *Attorney, Agent, or Firm*—Thelen Reid & Priest, LLP

(57) ABSTRACT

A device for providing wireless communication is disclosed. The device includes an antenna mounted on a personal computer card. The antenna has a pivotal connection for pivoting the antenna and a rotatable connection for rotating the antenna in a direction which differs from the direction of rotation. The antenna is rotatable about two axes and is retractable. In the extended position, the antenna is electrically connected with the personal computer card and can receive and transmit signals. The antenna also has a base which is detachably mounted to the personal computer card so that the antenna can be removed from said personal computer card and replaced.

16 Claims, 6 Drawing Sheets

RETRACTABLE ANTENNA FOR PERSONAL COMPUTER CARD

BACKGROUND OF THE INVENTION

1. Field of the Invention

The invention relates to personal computer cards, and more particularly, the invention relates to personal computer cards having adjustable antennas.

2. Brief Description of the Related Art

Personal computer cards, particularly cards conforming to the Personal Computer Memory Card International Association (PCMCIA) standard, have become a mainstay of mobile computing. A variety of devices are available in the PCMCIA format, including memory cards, modems, and disk drives.

PCMCIA cards are available in multiple form factors, including, in order of increasing thickness, Type I, Type II, and Type III cards. The development of mobile computing has resulted in an increased demand for wireless modems.

Typically, a PCMCIA wireless modem card has a receive/transmit antenna attached. The conventional antenna substantially protrudes from the PCMCIA wireless modem card. This is a vulnerable position for the antenna since antennas mounted on mobile computers are prone to damage due to accidental bumping.

Accordingly, what is needed is an antenna for use with a PCMCIA card that is easily adjustable and replaceable.

SUMMARY OF THE INVENTION

Disclosed is a device that is used with a personal computer to provide wireless communication.

In accordance with one aspect of the present invention, the device includes an antenna mounted on a personal computer card. The antenna has a pivotal connection, for pivoting the antenna about a first axis, and a rotatable connection for rotating the antenna in a direction which differs from the direction of pivot about the pivotal connector. Further, the antenna is retractable. In the retracted position, the antenna is substantially received by the personal computer card. When the antenna moves from the retracted position to the extended position, the antenna is electrically connected with the personal computer card and can receive and transmit signals.

In accordance with an additional aspect of the present invention, the device includes a personal computer card, a base detachably mounted to the personal computer card, and a retractable antenna reciprocally mounted to the base. The personal computer card has a top portion which is attachable to a bottom portion. The ba se is detachable from the personal computer card so that the antenna can be removed from the personal computer card without separating the top and bottom portions of the personal computer card.

The foregoing and other advantages of the present invention will become more apparent from following description and accompanying drawings.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

Figure 1:
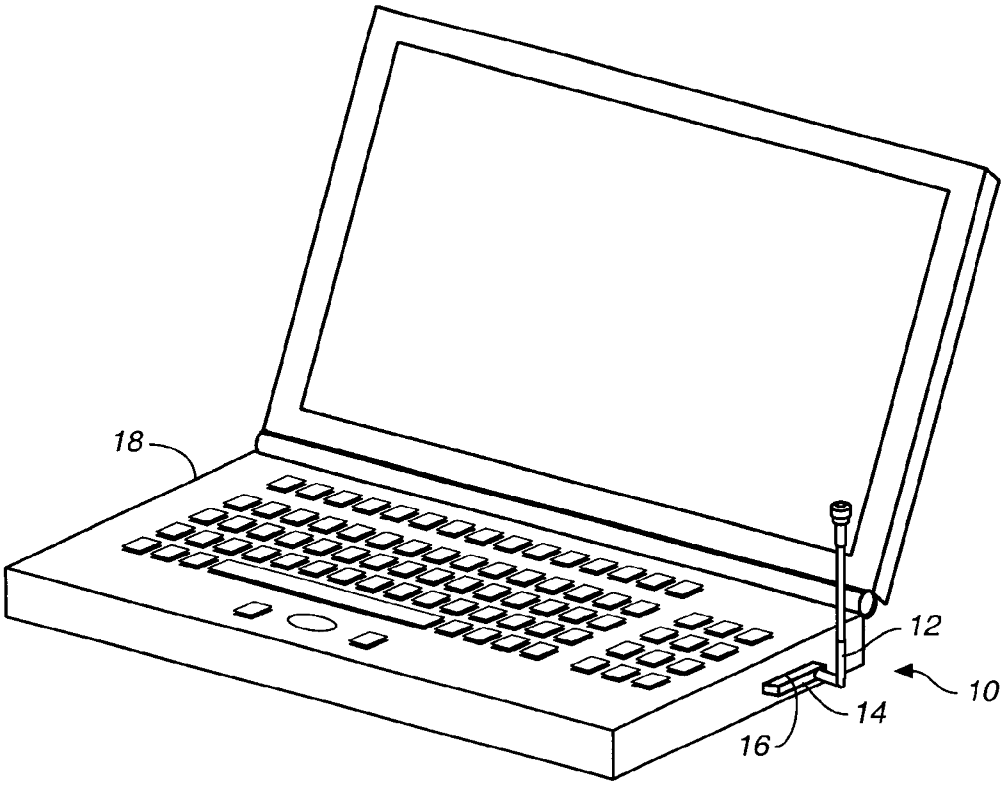
FIG. 1 is a perspective view of an antenna mounted to a personal computer card which is connected with a personal computer in accordance with one embodiment of the present invention.

FIG. 1 shows one embodiment of a device 10 which provides for wireless communication. The device 10 includes a receive/transmit antenna 12 connected to the base of a personal computer card 14 which may include a modem or a radio. The personal computer card 14 plugs into a PCMCIA Type II slot 16 of a personal computer 18 and enables a user to communicate with a wireless system using an air interface.

Figure 2:
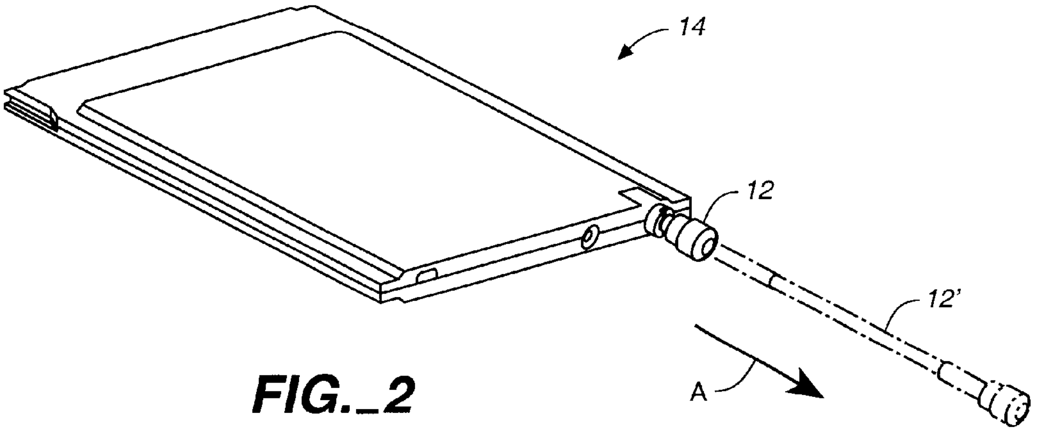
FIG. 2 is a perspective view of the personal computer card with the antenna in a retracted position.

The antenna 12 has a retracted position and an extended position. As shown in FIG. 2, the antenna 12 can reciprocally move between the retracted position and the extended position, shown in phantom lines as 12', in a direction of arrow A. In the retracted position, the antenna 12 is substantially received by the personal computer card 14. In the extended position, the antenna 12' substantially extends beyond the personal computer card 14.

Figure 3:
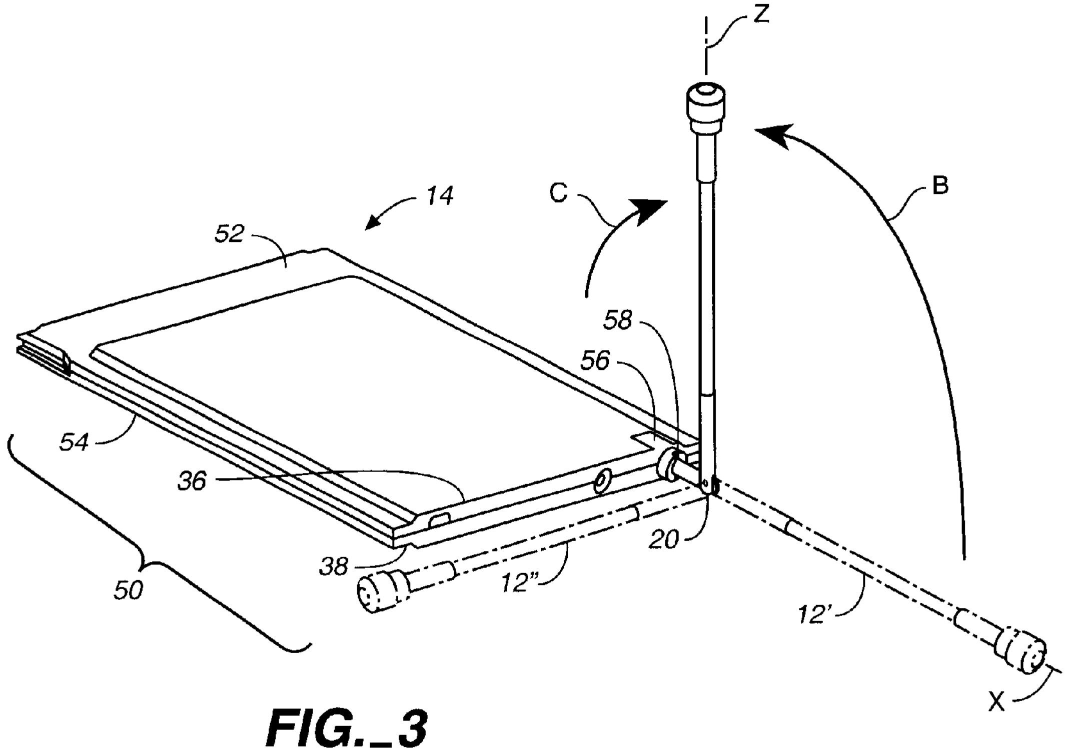
FIG. 3 is a perspective view of the personal computer card illustrating that the antenna is rotatable about the X-axis and about a pivotal connection.

FIG. 3 illustrates the antenna 12 pivotally rotated about a pivotal connection 20 from the extended position of FIG. 2, shown in phantom lines as 12', to a raised position where the antennae has been moved in a direction of arrow B. The pivotal connection 20 enables a user to adjust the position of the antenna 12 with respect to the personal computer card 14. The pivotal connection 20 may comprise any suitable means including, but not limited to, a hinge, such as a tongue-in-groove hinge. The pivotal connection allows the antenna 12 to pivot about an X-axis. Moreover, the antenna 12 is rotatable within a collar 58, and, therefore, has a rotatable connection for rotating the antenna about a Z-axis. Therefore, the antenna 12 can move from the lifted position to a lowered position, shown in phantom lines as 12", when the antenna is moved in the direction of arrow C. Accordingly, when the antenna 12' is in the extended position, the antenna has multiple axes of rotation. In particular, the antenna 12 can pivot about the pivotal connector 20 and can rotate about the X and Z axes so that the antenna may be moved into the most appropriate position to maximize the effectiveness of use.

Figure 4:
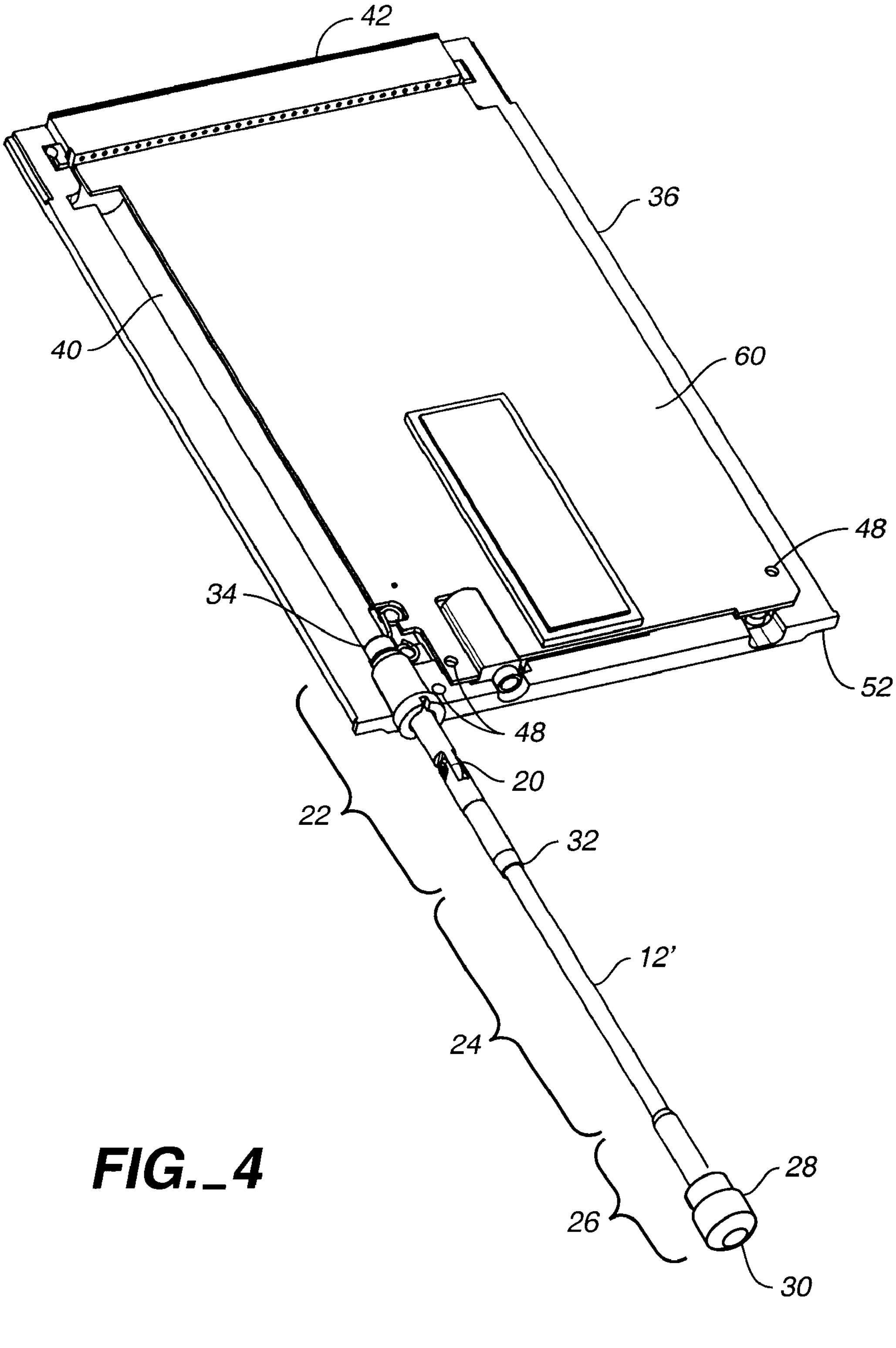
FIG. 4 is a perspective view of an inside surface of a top portion of the personal computer card.

One embodiment of the antenna 12', as shown in FIG. 4, includes three main elongated elements: a first antenna portion 22 having a substantially constant outer diameter, a narrower second antenna portion 24, and a third antenna portion 26 which has an end cap 28 mounted at a distal end 30. The first antenna portion 22 includes a first end 32, a second end 34, and the pivotal connector 20 positioned between the first and second ends. The first antenna portion 22 is formed of a conductive metal or has a conductive metal plating.

The first antenna portion 22 connects to a matching circuit which performs the impedance matching function for the extended antenna. In a preferred embodiment, the matching circuit comprises an inductor/capacitor (LC) circuit. The connection of the antenna to the electronics of the personal computer card will be further described below.

Figure 5:
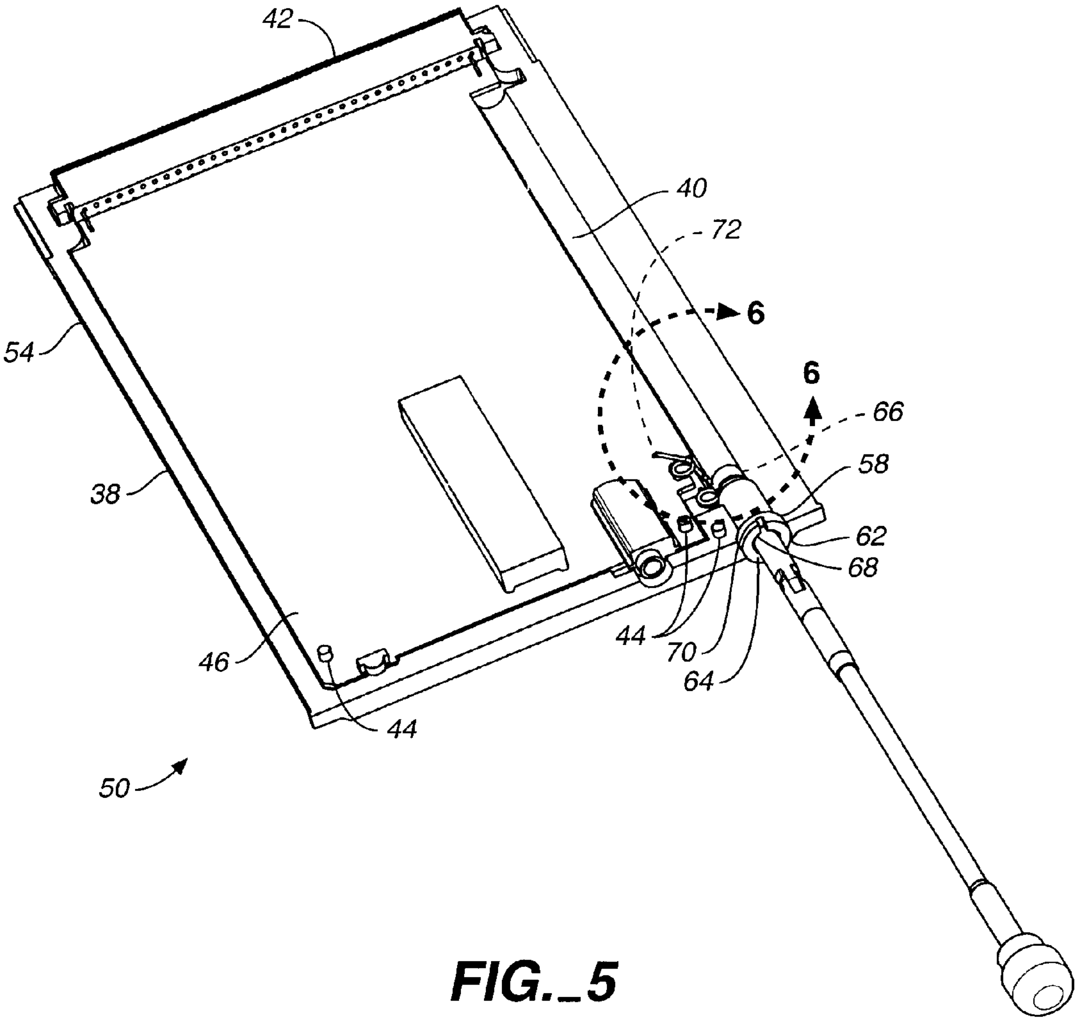
FIG. 5 is a perspective view of an inside surface of a bottom portion of the personal computer card.

FIGS. 3-5 illustrate one embodiment of the personal computer card 14. In this configuration, the personal computer card 14 includes a top portion 36, a bottom portion 38 which is attachable to the top portion, electrical components which are entirely enclosed by the top and bottom portions, and channel portions 40 located in the top and bottom portions. Also shown is a PCMCIA connector 42. FIG. 5 illustrates the bottom portion 38 of the personal computer card 14 having at least one alignment pin 44 (FIG. 5 shows three alignment pins) which extends from an inside surface 46 of the bottom portion. FIG. 4 shows the top portion 36 having corresponding openings 48 which receive the alignment pins 44 when the top and bottom portions 36, 38 are attached to form a housing 50 for the personal computer card 14.

Preferably, the top and bottom outside surfaces 52, 54 of the top and bottom portions 36, 38 are substantially coated with a conductive material to provide shielding for the electrical components located inside the personal computer card 14. The top and bottom portions 36, 38 are preferably otherwise formed of plastic. As best shown in FIG. 3, a cut out portion 56 is provided in the top and bottom outside surfaces 52, 54 adjacent to the collar 58, which supports the antenna 12 when the antenna is extended. The cut out portion 56 electrically separates the conductive shielding material and the collar 58. In an alternative embodiment, the inside surfaces 60, 46 of the top and bottom portions 36, 38 are coated with a conductive material to provide good shielding for the electrical components located inside the personal computer card 14.

FIG. 5 shows the collar 58, which is detachably mounted to the housing 50 of the personal computer card 14. The collar 58 connects the antenna to the personal computer card 14. The collar 58 includes a distal end 62 having a flange 64, a proximal end 66, and a passage 68 which extends from the distal end to the proximal end. As will be further described below, the collar 58 and antenna 12 are designed to be removable from the housing 50 without separating the top and bottom portions 36, 38 of the personal computer card 14. The flange 64 is mounted outside of the housing 50 and has at least one groove 70 to facilitate the removal of the collar 58 from the housing. The collar 58 is formed of a conductive metal. For example, the collar 58 may be threaded or otherwise fastened onto the personal computer card 14 to secure the antenna 12 in place. The collar 58 may then be unthreaded or otherwise unfastened from the card so that the antenna 12 may be replaced.

The passage 68 in the collar 58 is configured to slideably receive the antenna 12. Preferably, there is a friction fit between the outer diameter of the first antenna portion 22 and the inner diameter of the passage 68 to provide an electrical connection between the antenna 12 and the collar 58 and to provide a rotational connection between the antenna and the card. When the antenna 12 is in the extended position, the first antenna portion 22 snaps into and is juxtaposed to the collar 58. In addition, the second antenna portion 24 of the antenna 12 has a smaller outer diameter than the internal diameter of the first antenna portion 22. Accordingly, the second antenna portion 24 can slide freely within the passage 68 of the collar 58. The second antenna portion 24 is covered or coated with a nonconductive material.

Similarly, the third antenna portion 26 is covered or coated with a nonconductive material. The end cap 28 mounted at the distal end 30 of the third antenna portion 26 has an outer diameter larger than the inner diameter of the passage 68 of the collar 58. The end cap 28 prevents further insertion of the antenna 12 into the personal computer card 14 beyond a predetermined distance. Moreover, the end cap 28 provides a means for the user to grasp and reciprocally move the antenna 12 between the retracted position and the extended position.

Figure 6:
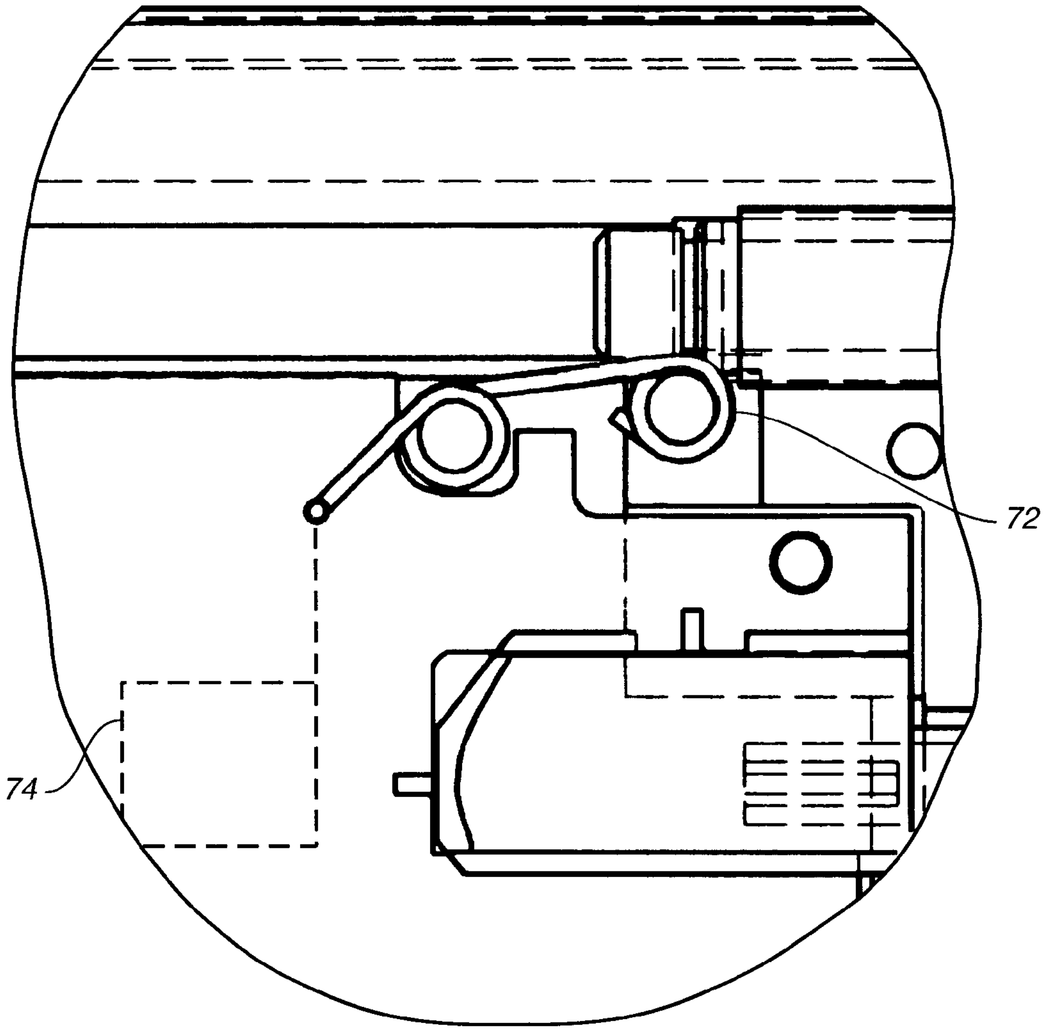
FIG. 6 is an enlarged partial view from 6—6 of FIG. 5.

A conductive member 72 is provided in the personal computer card 14 adjacent to the collar 58. The conductive member 72 is connected to electrical components enclosed in the personal computer card 14. The conductive member 72 may comprise any suitable means including, but not limited to, a torsion spring, a leaf spring, or a cantilever member. In one embodiment, the conductive member 72 is a torsion spring. As best shown in FIG. 6, the torsion spring 72 is compressed against the collar 58, thereby contacting the collar and ensuring a good electrical connection between the antenna and the electronics 74 in the personal computer card.

Figure 7:
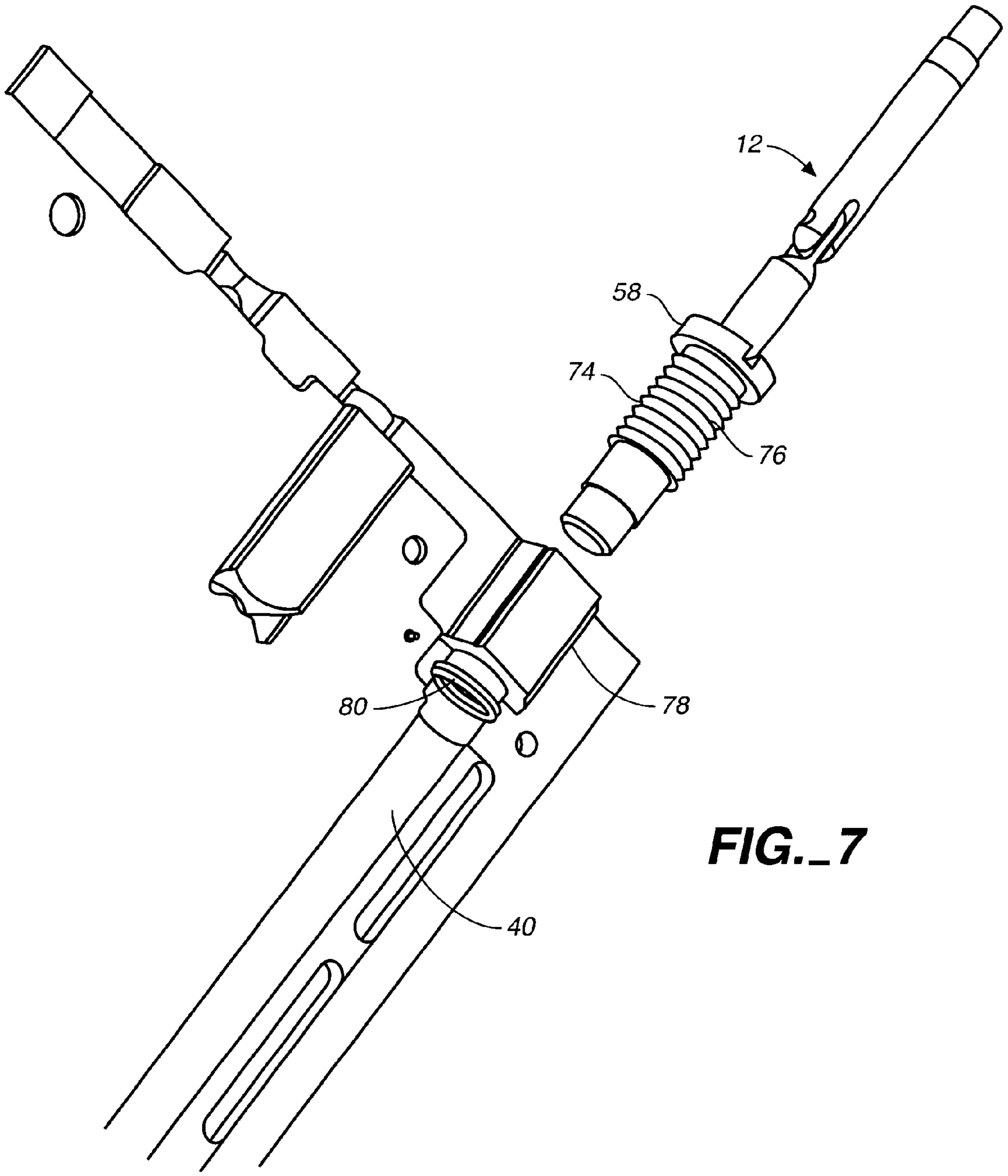
FIG. 7 is a close-up exploded view of the antenna and the personal computer card according to the present invention.

The antenna 12 is removable and replaceable from the personal computer card 14 so that the antenna may be replaced if it becomes damaged or broken. As shown in FIG. 7, the antenna 12 includes a base 74 with external threads 76. The threads engage internal threads located inside of a base housing 78 located in the personal computer card. The inner-most part of the base housing 78 includes a coil spring 80 that is used as the antenna electrical contact with the electronics in the personal computer card. The coil spring 80 is soldered to a connection to the electronics of the personal computer card and snaps into a corresponding groove inside channel 40. Since the antenna 12 may be unthreaded from the base 78, this embodiment allows the antenna to be replaced by the user without having to ship the personal computer card back to the manufacturer or to a repair technician.

In the alternative, the antenna base 74 and the base housing 78 may be fastened together by a snap fit, wherein one of the pieces would have a raised male portion and the corresponding piece would have a female portion to accept the male portion, one piece snapping into the other.

In operation, the device functions to receive and transmit electrical signals to and from the personal computer card 14. When the antenna 12 is in the retracted position, the channel portions 40 of the personal computer card 14 substantially receive the antenna. Further, the third antenna portion 26, formed of a nonconductive material, is adjacent to the collar 58. The antenna 12 does not receive or transmit any signals when in the retracted position. By slidably moving the antenna 12 from the retracted position to the extended position, the first antenna portion 22, formed of a conductive material, contacts the collar 58, wherein a signal can be transmitted from electrical components enclosed in the personal computer card 14 through the conductive member 72 to the collar 58 and then to the antenna. As discussed, the antenna can pivot about the pivotal connector 20 and can rotate about the X-axis so that the antenna may be moved into the most appropriate position to maximize the effectiveness of use.

In an alternative embodiment, the antenna 12 is substantially similar to the embodiment shown in FIG. 5, except that the third antenna portion 26 is formed of a conductive material or has a conductive metal plating, similar to the first antenna portion 22. Moreover, the third antenna portion 26 includes a secondary antenna substantially contained in the end cap 28. Preferably, there is a very small clearance or a close fit between the outer diameter of the third antenna portion 26 and the inner diameter of the passage 68 in the collar 58. The close fit between the third antenna portion 26 and the collar 58 allows for an electrical connection between the antenna 12 and the collar when the third antenna portion is juxtaposed to the collar. For example, the end cap 28 can substantially contain a supplemental helical antenna. Accordingly, when the antenna 12 is in the retracted position, the third antenna portion 26 is adjacent to the collar 58, and an electrical connection is provided between the collar 58 and the helical antenna. Thus, the antenna 12 can transmit and receive signals in the retracted position, as well as in the extended position.

The personal computer card 14 shown in the figures is a PCMCIA Type II card, but it is within the scope of the invention to use a PCMCIA Type I or Type III card, as well. Likewise, it is within the scope of the invention that the personal computer card 14 can be any of a variety of removable cards that are not restricted to the PCMCIA standard specifications.

While the invention has been described in detail with reference to the preferred embodiments thereof, it will be apparent to one skilled in the art that various changes and modifications can be made and equivalents employed without departing from the present invention.

What is claimed is:

1. A device for providing wireless communication, the device comprising:

a personal computer card; and an antenna mounted to the personal computer card, the antenna comprising at least a first section and a second section;

the antenna including a pivotal connection for pivoting said first section of the antenna about a first axis relative to said second section of the antenna; and a rotational connection for rotating the antenna about a second axis which differs from the first axis;

the rotational connection allows the antenna to reciprocally move therein so that the antenna has a retracted position and an extended position, wherein the antenna is substantially received by the personal computer card in the retracted position.

2. The device for providing wireless communication of claim 1, wherein the antenna is in the extended position, the antenna substantially extends beyond the personal computer card and the antenna is electrically connected to the personal computer card.

3. The device for providing wireless communication of claim 1, further comprising the antenna being detachably mounted to the personal computer card.

4. The device for providing wireless communication of claim 3, wherein the personal computer card has a top portion and a bottom portion, and the antenna is detachable from the personal computer card without separating the top and bottom portions of said personal computer card.

5. The device for providing wireless communication of claim 1, wherein a spring located inside of the personal computer card is in electrical contact with the antenna.

6. The device for providing wireless communication of claim 5, wherein the spring provides an electrical connection between the personal computer card and the antenna when antenna is extended a distance beyond said personal computer card.

7. The device for providing wireless communication of claim 5, wherein the spring is a torsion spring.

8. The device for providing wireless communication of claim 4, wherein the top portion of the personal computer card has a conductive layer for providing electrical shielding for the personal computer card.

9. The device for providing wireless communication of claim 8, wherein the conductive layer has a cut out portion which electrically separates the conductive layer from the antenna.

10. The device of providing wireless communication of claim 3, wherein the device further comprises a collar that is removably fastened to the personal computer card to secure the antenna.

11. A device for providing wireless communication, comprising:

a personal computer card;

an antenna mounted to the personal computer card, the antenna having a retracted position and an extended position, wherein the antenna is slideably excased by the personal computer card in the retracted position; and a collar detachably mounted to the personal computer card wherein, when the collar is detached from the personal computer card, the antenna can be removed from said personal computer card.

12. The device for providing wireless communication of claim 11, wherein the antenna has a rotational connection with the personal computer card.

13. The device for providing wireless communication of claim 12, wherein the antenna has a pivotal connection.

14. The device for providing wireless communication of claim 13, wherein the rotational connection and the pivotal connection allow the antenna to be moved about two axes.

15. The device for providing wireless communication of claim 11, wherein the personal computer card includes a top portion and a bottom portion, wherein the antenna is detachable from the personal computer card without separating the top and bottom portions of said personal computer card.

16. The device for providing wireless communication of claim 11, wherein the personal computer card includes a conductive layer that has a cut out portion which electrically separates the conductive layer from the collar.

* * * * *

UNITED STATES PATENT AND TRADEMARK OFFICE

CERTIFICATE OF CORRECTION

PATENT NO. : 6,847,830 B1
DATED : January 25, 2005
INVENTOR(S) : Vanderhelm et al.

It is certified that error appears in the above-identified patent and that said Letters Patent is hereby corrected as shown below:

<u>Column 1,</u>
Line 50, replace "ba se" with -- base --.

<u>Column 6,</u>
Line 30, replace "excased" with -- encased --.

Signed and Sealed this

First Day of November, 2005

JON W. DUDAS
*Director of the United States Patent and Trademark Office*